June 26, 1934.  T. PIZZA  1,964,674
LEATHER CUTTING MACHINE
Filed Jan. 30, 1933  2 Sheets-Sheet 1
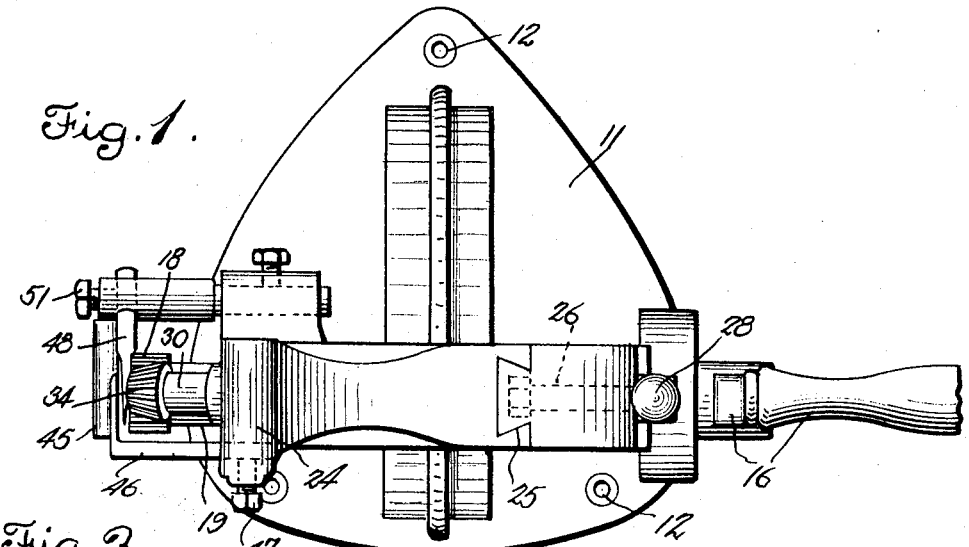
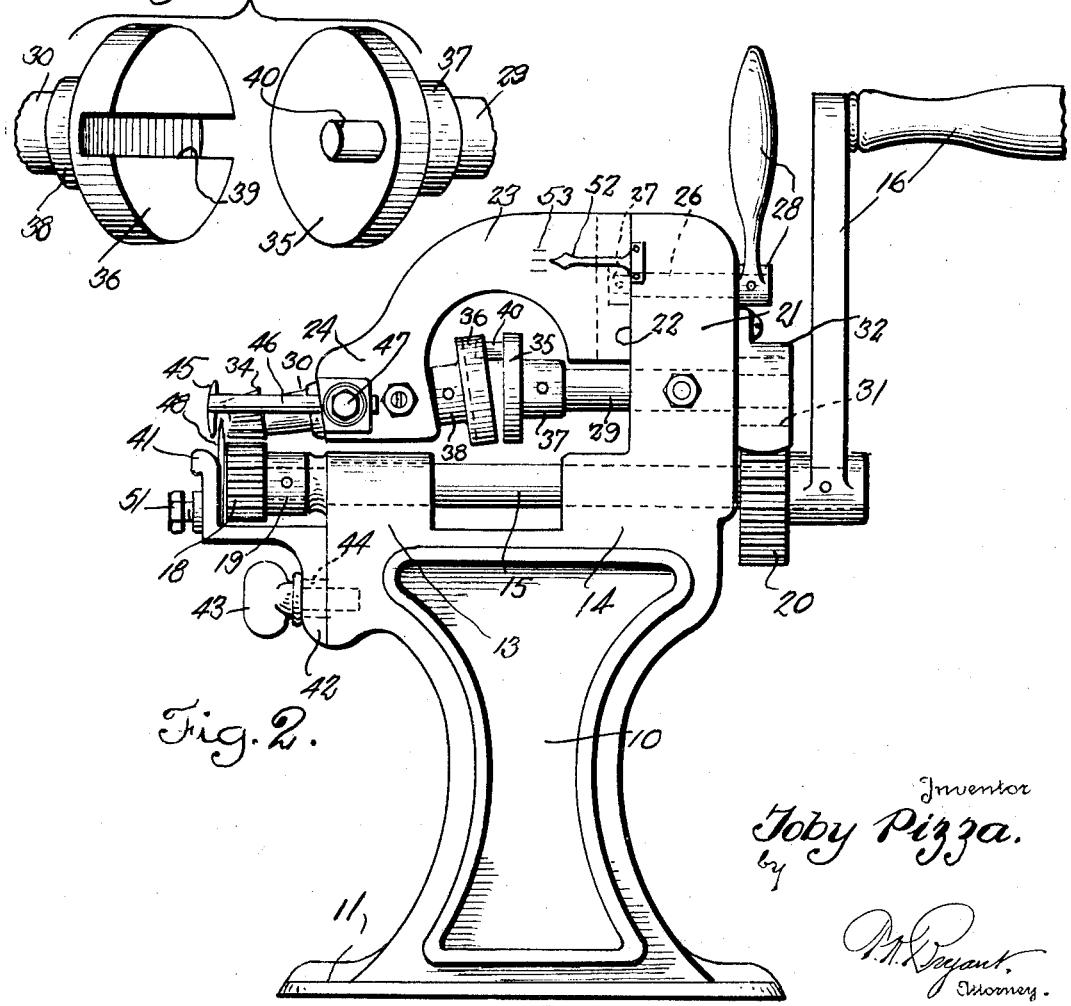
Inventor
Toby Pizza June 26, 1934.                T. PIZZA                1,964,674
                        LEATHER CUTTING MACHINE
                          Filed Jan. 30, 1933            2 Sheets-Sheet 2
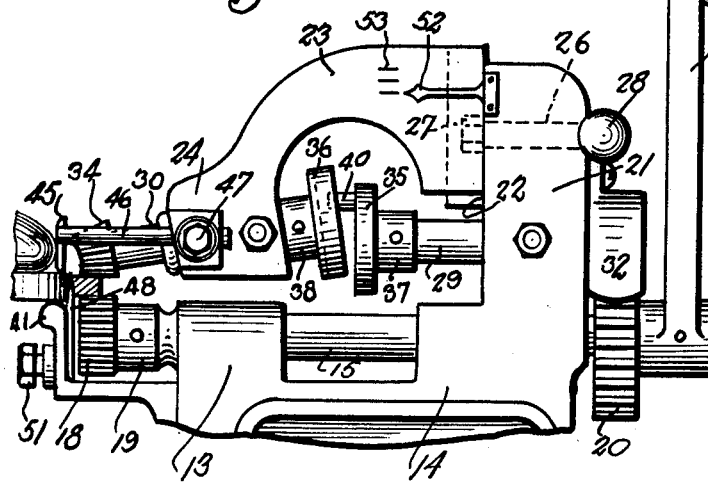
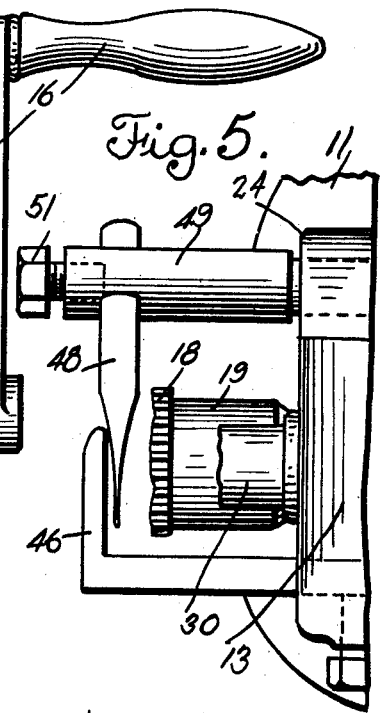
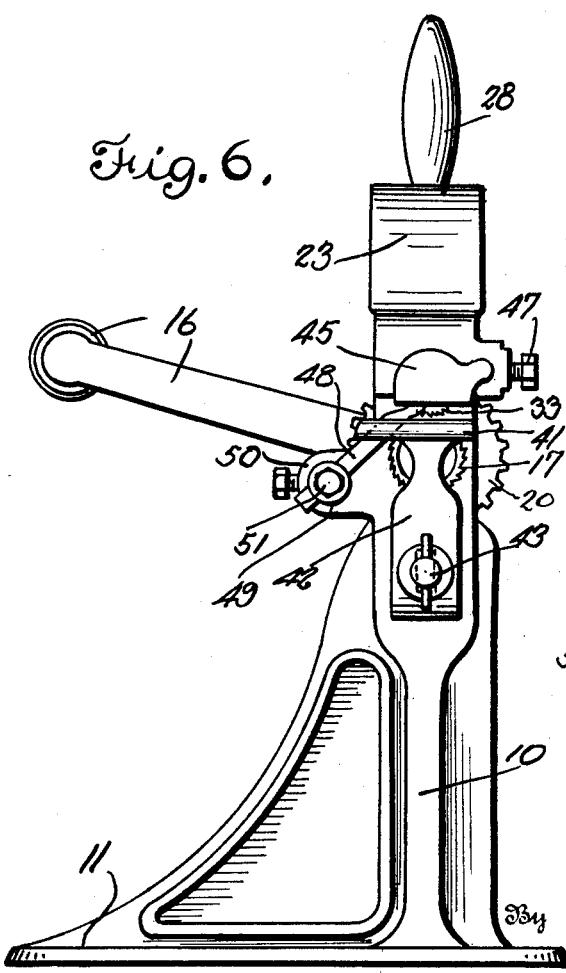
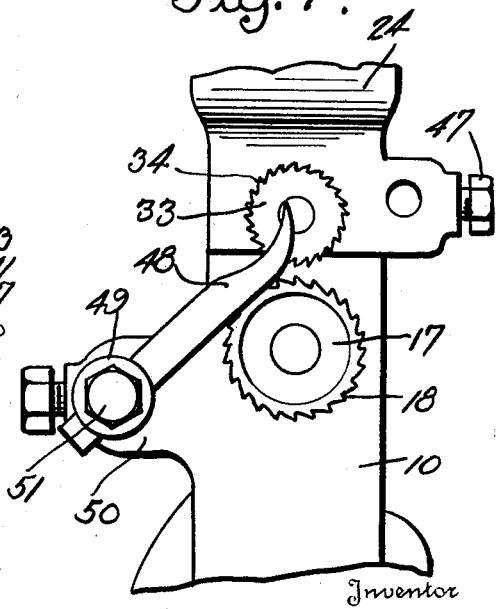
Inventor
Toby Pizza.

Patented June 26, 1934

1,964,674

UNITED STATES PATENT OFFICE 1,964,674

LEATHER CUTTING MACHINE

Toby Pizza, Toledo, Ohio, assignor of one-half to Gustave Gilles, Toledo, Ohio

Application January 30, 1933, Serial No. 654,309

1 Claim. (Cl. 12—85)

This invention relates to certain new and useful improvements in leather cutting apparatus.

The primary object of the invention is to provide a leather cutting apparatus for use in the repairing of shoes and is designed for trimming or cutting off the marginal edges of shoe soles or heels after the soles have been secured to the shoe to reduce the same to the desired dimensions and eliminates the usual hand method of trimming or cutting with a knife which in many instances is dangerous to the shoemaker and also inaccurate in trimming or cutting the secured leather sole or heel lift to the proper size.

A further object of the invention is to provide shoe leather cutting apparatus of the foregoing character wherein the projecting edge of the shoe sole or heel lift is received between feed rollers that are peripherally toothed for gripping opposite faces of the edge of the leather for positively feeding the same through the machine into engagement with a cutting blade, positive driving means being provided for the two feed rollers with the driving means for the upper feed roller comprising a two-part shaft having an adjustable operative connection between adjacent ends of the shaft sections with one of the shafts disposed at an inclination and carried by a vertically adjustable bracket to provide for the feeding of leather of different thicknesses by the feed rollers to the cutting blade.

With the above and other objects in view that will become apparent as the nature of the invention is better understood, the same consists in the novel form, combination and arrangement of parts hereinafter more fully described, shown in the accompanying drawings and claimed.

In the drawings:—

Figure 1 is a top plan view of the leather cutting apparatus constructed in accordance with the present invention;

Figure 2 is a side elevational view showing the corrugated feed rollers and the two-part drive shaft for the upper roller permitting vertical adjustment of the upper roller relative to the lower roller;

Figure 3 is a perspective view showing the adjustable connection between adjacent ends of the two-part drive shaft for the upper feed roller;

Figure 4 is a fragmentary side elevational view with the bracket carrying the upper feed roller and one section of the two-part shaft elevated with respect to the lower feed roller;

Figure 5 is a fragmentary top plan view showing the cutting blade and the guard for limiting positioning of the leather edge between the feed rollers;

Figure 6 is an end elevational view of the machine showing the shoe rest or support and the shoe positioning guard; and Figure 7 is a fragmentary end elevational view with the shoe support and guard removed showing the relation of the feed rollers and the cutting blade.

Referring more in detail to the accompanying drawings, there is illustrated a machine for cutting excess leather from a shoe sole or heel lift after the same has been secured to a shoe to reduce the same to the desired dimensions without the use of a hand knife as is now customarily employed and thereby eliminating injury to the shoemaker as well as accomplishing the trimming or cutting of the excess leather at the edge of a shoe sole or heel lift in a more accurate manner.

The machine comprises a frame including a floor standard 10 having a relatively large base 11 provided with openings 12 to facilitate rigid mounting thereof upon a table or other support. A pair of spaced horizontal bearings 13 and 14 are carried by the upper end of the standard 10 and in which bearings a drive shaft 15 is journalled illustrated as operated by the crank arm 16 although it is to be understood that this shaft may be motor driven if desired. The end of the shaft 15 extending outwardly of the bearing 13 carries a feed roller 17 peripherally toothed as at 18 and secured to the projecting end of the shaft 15 by means of the pin anchored collar 19 carried by the feed roller 17. The other end of the shaft 15 projects outwardly of the bearing 14 to accommodate the mounting of the crank arm 16 and has fixed thereto inwardly of the crank arm the gear wheel 20 for the operation of a shaft that drives a roller cooperating with the feed roller 17.

A perpendicular block 21 is formed integral with and rises above the bearing 14 and on the vertical wall 22 there is mounted the laterally and forwardly directed bracket arm 23 provided with a bearing 24 overlying the bearing 13. The connection between the bracket arm 23 and the vertical wall 22 of the block 21 is of dove-tailed character as shown at 25 to permit vertical adjustment of the bracket arm 23 upon the block 21, such adjustment and maintenance in said position being accomplished by the shaft 26 journalled through the upper end of the block 21 with a cam 27 upon one end thereof working in a correspondingly formed opening in the mounted end of the bracket arm with the cam lever 28 secured to the outer projecting end of the shaft 26 for maintaining the shaft and bracket arm in adjusted positions.

A two-part driven shaft comprising sections 29 and 30 are respectively journalled in the block 21 and bracket arm bearing 24, the shaft section 29 being horizontally journalled in the block 21 with one projecting end thereof carrying a gear wheel 31 in mesh with the drive gear 20, the guard 32 overlying the gear wheel 31. The shaft section 30 is journalled at an inclination in the bearing 24, the outer projecting end thereof carrying a conical feed roller 33 that is peripherally toothed as at 34 and located above the feed roller 17 as illustrated.

The connecting means for the adjacent ends of the shaft sections 29 and 30 respectively include disk heads 35 and 36 carrying collar members 37 and 38 for reception and retention upon the ends of the shafts 29 and 30. As shown more clearly in Figure 3, the head 36 is provided with a transversely extending facial groove 39 into which extends the facially projecting pins 40 eccentrically mounted upon the head 35.

In the use of the machine, a shoe upper that has a sole or heel lift initially secured thereto with the usual projecting untrimmed edge has such projecting edge inserted between the feed rollers 17 and 33 to be gripped by the feed roller teeth 18 and 34 respectively, as shown in Fig. 4 of the drawings and with the shoe sole or heel being supported upon the arm or rest 41 carried by the bracket 42 that is adjustably secured to the standard 10 below the bearing 13 by means of the adjusting screw 43 extending through a slotted opening 44 in the bracket 42 and to limit the depth of insertion of the projecting edge of the leather between the feed rollers, there is provided a guard 45 carried by the rod 46 adjustably mounted upon a side of the bearing 24 of the bracket arm 23 by means of the adjusting screw 47. The leather cutting blade 48 as shown more clearly in Figures 5 to 7 is adjustably mounted in a supporting arm 49 carried by an offset 50 on the standard 10 by means of the adjusting screw 51, the cutting edge of the blade traversing the space between the feed rollers 17 and 33 and traversing the outer ends of the feed rollers as shown in Figure 7. When the drive shaft 15 is rotated by means of the crank arm 16 or motive power applied thereto, the feed roller 18 is rotated while the two-part driven shaft comprising the sections 29 and 30 is also rotated by means of the gear connections 20 and 31 between the two shafts, the feed roller 33 being positively driven by the driven shaft for the feeding of the shoe sole or heel lift to the cutting blade 48. The bracket arm 23 is vertically adjustable upon the block 21 to accommodate the reception between the feed rollers of leather soles or heel lifts of different thicknesses, the groove 39 in the head 30 being vertically disposed to permit upward movement of the bracket arm and shaft section 30 carried thereby with the pin 40 remaining in the groove 39, the bracket arm being retained in adjusted positions by means of the cam lever 28. The positioning or adjustment of the bracket arm 23 upon the block 21 and the spacing of the feed rollers 17 and 33 for soles or heel lifts of different thicknesses may be determined by the gage device including the indicator finger 52 carried by the block 21 that cooperates with the markings or graduations 53 carried by the bracket arm 23. The bracket arm is illustrated in Figure 2 in its lowered position with the pin 40 adjacent one end of the groove 31 that has been moved to a vertical position, while in Figure 4, the bracket arm 23 carrying the shaft section 30 and feed roller 33 is illustrated in an elevated position with the pin 40 located at a lower point in the transverse groove 39, these relative positions being indicated by the indicator finger 52 and the graduations 53.

From the above detailed description of the invention, it is believed that the construction and operation thereof will at once be apparent, it being noted that while the machine has been described as cutting the untrimmed or projecting edges of shoe soles or heel lifts, the same may also be employed for various other cutting operations and while there is herein shown and described the preferred embodiment of the invention, it is nevertheless to be understood that minor changes may be made therein without departing from the spirit and scope of the invention as claimed.

I claim:—

In a leather cutting machine, a drive shaft, a bearing support therefor, a two-part interconnected driven shaft, a block rising from the bearing support providing a bearing for one section of the two-part shaft, a bracket arm vertically adjustable on the block overlying the drive shaft and forming a support for the other section of the two-part shaft, a feed roller on the forward end of the last named shaft section and adjacent the end of the drive shaft, a freely shiftable connection between interconnected ends of the two-part shaft comprising a head on each shaft section, one head having a facial transverse groove therein, a pin carried by the other head working in the groove, means for vertically adjusting the bracket, comprising a cam element carried by the block and engaging with the bracket, an indicator finger on the block, and graduations on the bracket cooperating with the finger to determine adjustment of the bracket and space between the feed rollers.

TOBY PIZZA.